United States Patent
Bond et al.

(10) Patent No.: US 6,662,025 B1
(45) Date of Patent: Dec. 9, 2003

(54) MOBIL PHONE WITH ADAPTIVE USER INTERFACE

(75) Inventors: Jeffrey Bond, Berkshire (GB); Steven J. F. Grove, Hampshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/478,894

(22) Filed: Jan. 7, 2000

(30) Foreign Application Priority Data

Jan. 9, 1999 (GB) ................................. 9900360

(51) Int. Cl.$^7$ ................................. H04B 7/00

(52) U.S. Cl. .................. 455/565; 455/150.1; 455/414.1

(58) Field of Search ................................. 455/565, 414, 455/512, 513, 575, 95, 150.1

(56) References Cited

U.S. PATENT DOCUMENTS

| 5,535,260 | A | * | 7/1996 | Zicker et al. ................... 379/63 |
| 5,634,134 | A | * | 5/1997 | Kumai et al. ................. 395/798 |
| 5,797,098 | A | | 8/1998 | Schroeder et al. ........... 455/464 |
| 5,952,942 | A | * | 9/1999 | Balakrishnan et al. ........ 341/20 |
| 6,307,548 | B1 | * | 10/2001 | Flinchem et al. ............ 345/352 |

* cited by examiner

*Primary Examiner*—Edward F. Urban
*Assistant Examiner*—Thuan T. Nguyen
(74) *Attorney, Agent, or Firm*—Sughrue Mion, PLLC

(57) ABSTRACT

A mobile phone with adaptive interface is disclosed. The frequency distribution table stores frequency occurrences of each character in messages entered into or received by the mobile phone. When entering text messages, a controller displays the character of the character group on a display in an order based on the frequency distribution stored in the frequency distribution table, whenever input means is operated.

7 Claims, 6 Drawing Sheets

MOBIL PHONE WITH ADAPTIVE USER INTERFACE

BACKGROUND OF THE INVENTION

1. Field of the Invention

This invention relates to mobile phones, and more particularly to the user interface of mobile phones.

2. Description of the Related Art

With many mobile phones, when entering text messages such as SMS (short message service) or address book entries on alphanumeric keyboards, the user must press each key one or more times for each letter to be entered. An alphanumeric group of characters (letters and numerals) presented on the display is associated with a particular key and each press of that key causes stepped movement of each character of the group through a cursor. The character under the cursor is then be entered into the message.

The order of initial presentation of the displayed group is constant and takes the format, for key "2", "ABC2" so that a single key press would move the cursor to "BC2A", two presses to "C2AB" et seq. In such a standard phone keypad arrangement, with "ABC" on key "2", "DEF" on key "3" and so on, it is the case more often than not, that the required letter is the third letter on each key, requiring three key presses to enter the required letter.

Similarly when it is required to enter numerals within a text message four key presses will usually be needed for entry of each numeral. The incidence of numbers within text messages e.g. SMS is increasing. Further characters may be included for selection by each key i.e. ABC2xxx, where the characters xxx could be used to provide letters for use in non-English text, for example characters with circumflex or cedilla. Such further characters may be included in any calculation of frequency distribution but to avoid prolixity will not form part of the examples given.

Prior art methods include causing the cursor to skip quickly over unwanted letters or numerals by means of a long key press. When the key is held down for longer than a specified period (a long key press) the cursor continues to step through the characters displayed until pressure on the key is removed. When the key is held down for less than a specified period (a short key press) the cursor moves only to the next character displayed and remains at that character. It has been found that selection by means of long and short key presses does not appeal to the users of mobile phones.

SUMMARY OF THE INVENTION

It is an object of the invention to provide an improved user interface for mobile phones in which the selection of displayed characters is simplified and the time taken for character selection is reduced.

To achieve the above-described object, a mobile phone according to the present invention comprises an input means, a display, and a controller. The character group is stored associated with the input means in the controller. When a text messages is entered, the controller displays the character of the character group on the display in an order based on a normal frequency distribution for standard prose, whenever the input means is operated. A plurality of characters are allocated to each input means, and the input means is operated when the user enters a message. The display displays a plurality of characters allocated to each input means. A controller displays the characters on the display in an order that frequency occurrences based on a normal frequency distribution for standard prose is high whenever the input means is operated, and selects one character among character group displayed on the display by the subsequent operation of the input means by the user.

According to an embodiment of the present invention, when the previous selection of the user is a numeral, a numeral within each character group is displayed at the head of the character group.

According to another mobile phone of the present invention further comprises a frequency distribution table. The frequency distribution table stores frequency occurrences of each character in messages entered into or received by the mobile phone. The controller updates the frequency occurrence stored in the frequency distribution table whenever message is entered or received, and displays the characters on the display in an order that frequency occurrences stored in the frequency distribution table is high whenever the input means is operated, and selects one character among character group displayed on the display by the subsequent operation of the input means by the user.

An example of alternative input means suitable for small mobile phones such as pen phones is described in U.S. Pat. No. 5,754,645 to Metroka et al.

The above and other objects, features and advantages of the present invention will become apparent from the following description with reference to the accompanying drawings which illustrate examples of the present invention.

DETAILED DESCRIPTION OF THE PREFERRED EMBODIMENTS

First Embodiment

Figure 1:
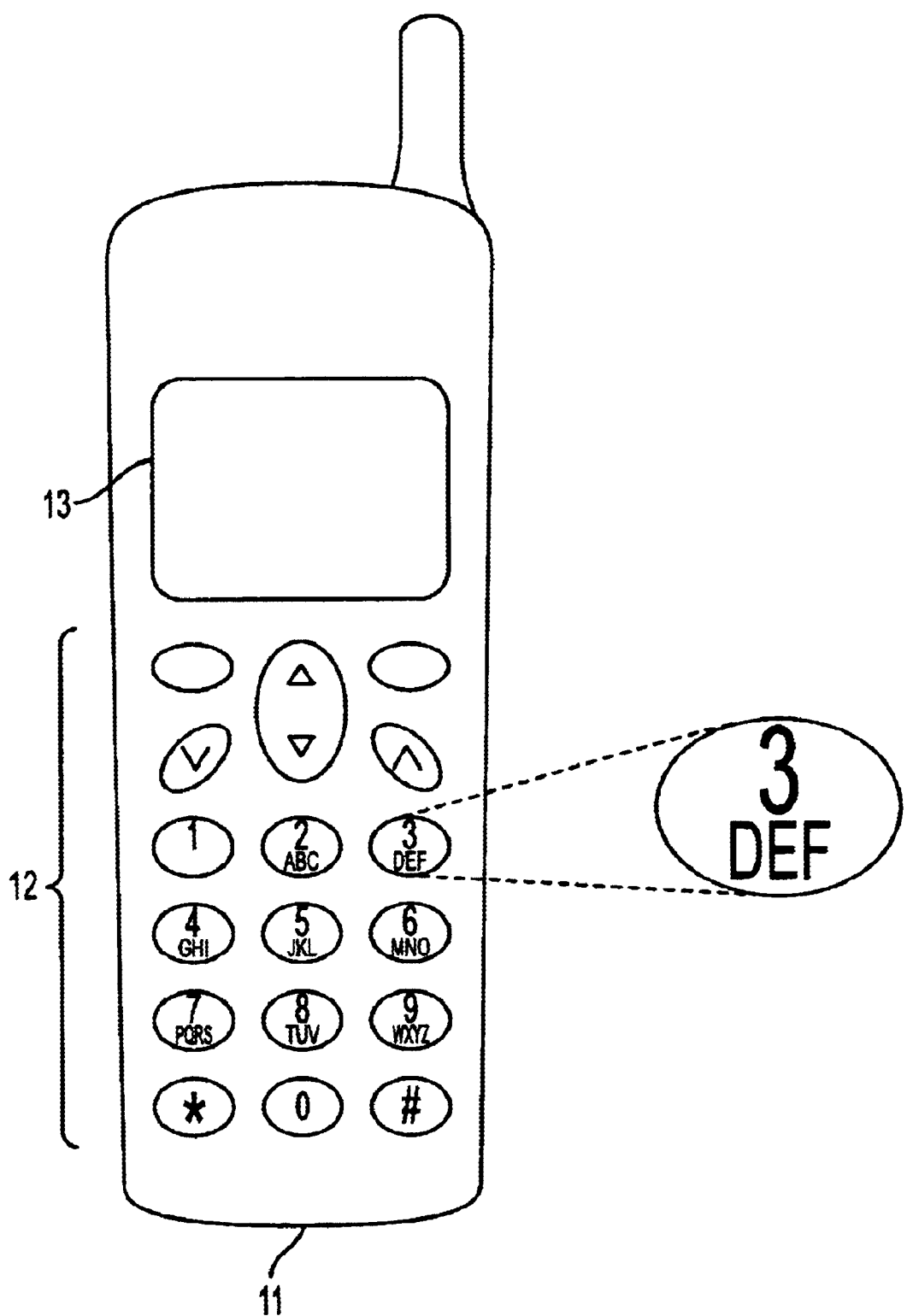
FIG. 1 illustrates one mobile phone user interface.

With reference to FIG. 1, a mobile phone is shown generally at 11 and has a user interface comprising a keypad 12 and display 13. The keypad 12 includes a number of keys for the input of both letters and numerals and these alpha numeric keys may be used to generate short messages for transmission. The face of a key "3" is expanded to show more clearly the marking on the face of the key.

Figure 2:
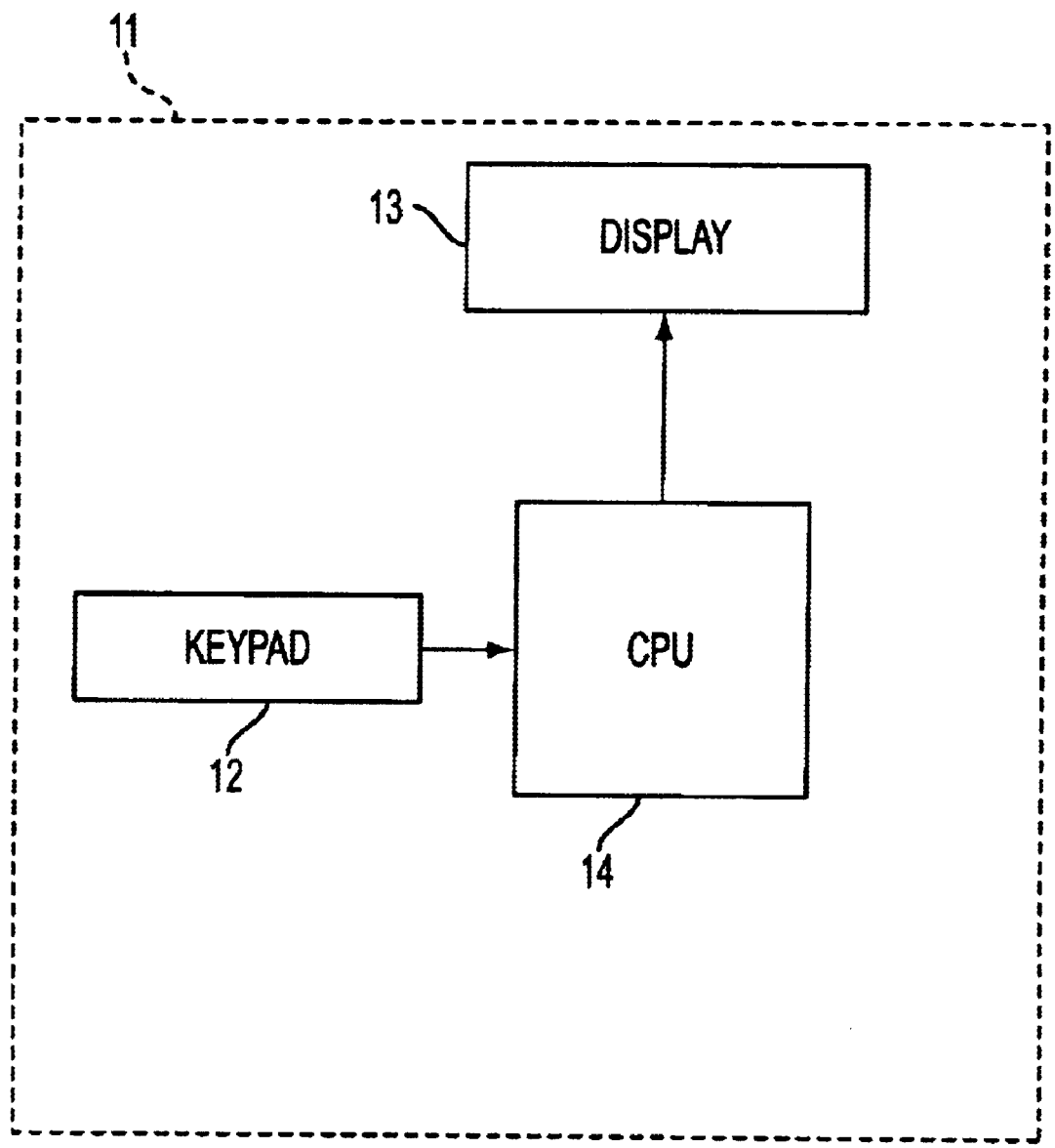
FIG. 2 is a block diagram of the first embodiment of the present invention.
Figure 3:
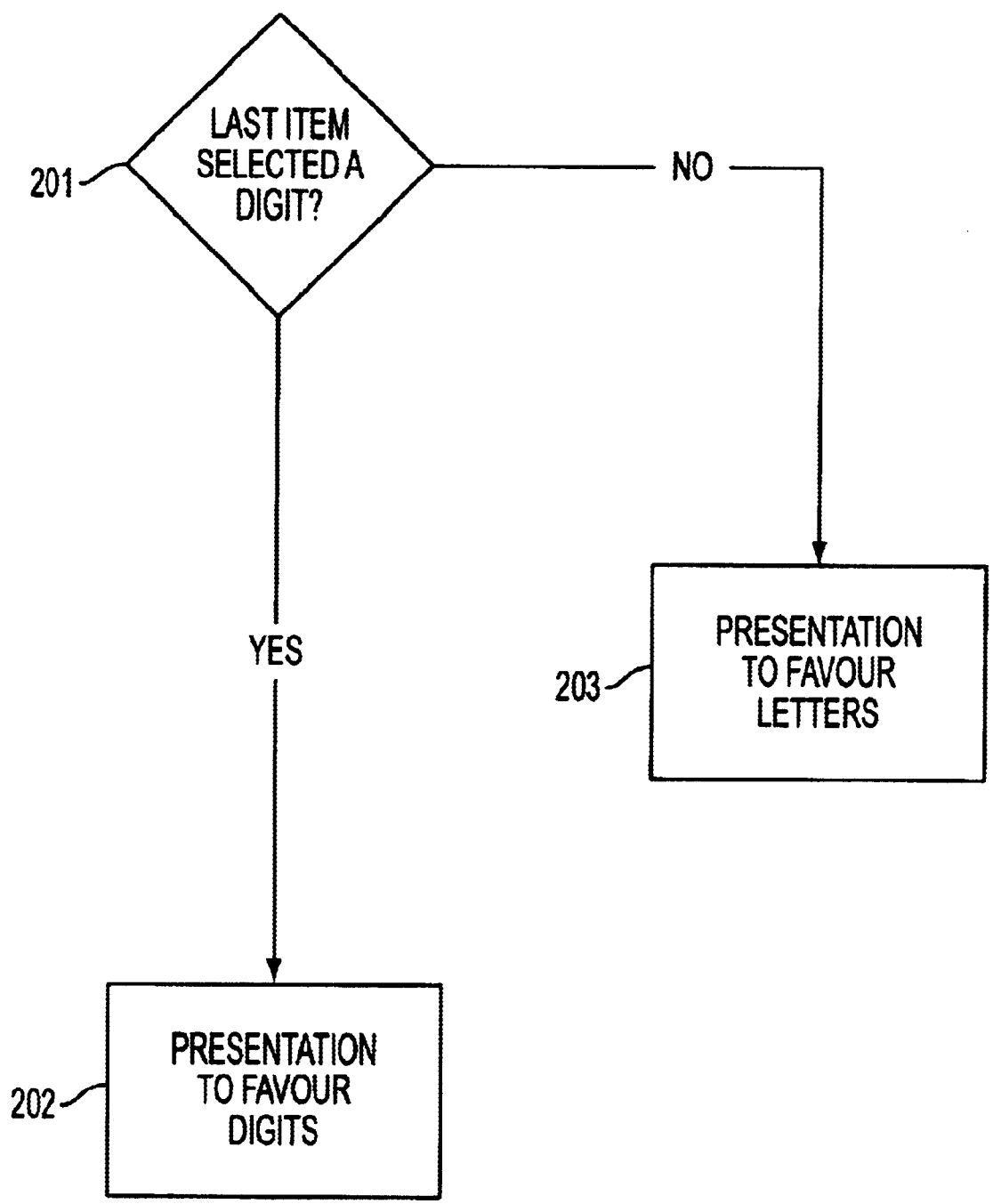
FIG. 3 is a flow diagram for adaptive presentation.

With reference to FIG. 2, mobile phone 11 according to the present invention comprises display 13, keypad 12, and CPU 14.

The alphanumeric group is stored associated with the each number key of keypad 12 in the CPU 14. When entering text messages, CPU 14 displays the character of the alphanumeric group on display 13 in an order based on a normal frequency distribution for standard prose, whenever keypad 12 is operated.

The variation in frequency of occurrence of individual letters in English prose is well known and was used for developing the Morse Code. The following frequencies of occurrence Table 1 have been computed from the Encyclopaedia Britannica page on cryptography. The computations have been rounded here to 2 decimal points:

TABLE 1

| E | 0.10 | I | 0.09 | T | 0.08 | N | 0.07 | O | 0.07 | A | 0.07 |
|---|------|---|------|---|------|---|------|---|------|---|------|
| R | 0.06 | S | 0.05 | Q | 0.05 | H | 0.04 | L | 0.04 | D | 0.04 |
| P | 0.03 | M | 0.03 | Y | 0.03 | F | 0.03 | G | 0.03 | U | 0.02 |
| B | 0.02 | W | 0.01 | V | 0.01 | K | 0.01 | X | 0.01 | Q | 0.00 |
| Z | 0.00 | J | 0.00 |   |      |   |      |   |      |   |      |

Naturally, slightly different frequency distributions will be obtained from different texts and normal frequency distributions for standard prose will be affected by the abbreviations and jargon associated with the type of short messages used with mobile phones. Additionally, some people tend to make use more frequently than others of particular words and phrases so that the frequency distributions are effectively personalised. Furthermore, an individual's selection of words and phrases as suitable for inclusion in a message can vary quite quickly under the influence of current style.

The usual allocation for each alpha numeric keys 2,3,4, 5,6,7,8,9 is ABC2, DEF3, GHI4, JKL5, MNO6, PQRS7, TUV8, WXYZ9, respectively. Using the above table 1, the chance of a required letter being the first letter on a key is $$p(A)+p(D)+p(G)+p(J)+p(M)+p(P)+p(T)+p(W)=0.29.$$

The chance of a required letter being the second letter on a key is $$p(B)+p(E)+p(H)+p(K)+p(N)+p(Q)+p(U)+p(X)=0.28.$$

The chance of a required letter being the third or fourth letter on a key is $$p(C)+p(F)+p(I)+p(L)+p(O)+p(R)+p(V)+p(Y)+p(S)+p(Z)=0.43.$$

Therefore it is most likely that for each letter of standard English text (not randomly chosen letters) three key presses will be needed. A keypad for implementation of the embodiment retains the groups of letters and numerals usually assigned to each key and the usual markings on the keys (ABC, DEF etc.). The presentation of characters for selection, however, is re-arranged in the order that the frequency occurrence according to Table 1 is greater. The order of selection of the improved keyboard is now ACB2, EDF3, IHG4, LKJ5, NOM6, RSPQ7, TUV8, YWXZ9.

With the improved keypad arrangement:
the chance of a required letter being the first letter on a key is $$p(A)+p(E)+p(I)+p(L)+p(N)+p(R)+p(T)+p(Y)=0.54.$$

The chance of a required letter being the second letter on a key is $$p(C)+p(D)+p(H)+p(K)+p(O)+p(S)+p(U)+p(W)=0.29.$$

The chance of a required letter being the third or fourth letter on a key is $$p(B)+p(F)+p(G)+p(J)+p(M)+p(P)+p(V)+p(X)+p(Q)+p(Z)=0.17.$$

Use of the improved keypad allows therefore the required letter to be available most of the time with a single key press. By way of example, listed below are the number of key presses (including one key press for each space) needed to enter the message: "hello how are you today".

Normal Keypad: 46 key presses
Improved Keypad: 32 key presses (30% saving)

Second Embodiment

The invention may be extended to provide adaptively an order for selection of characters from a group of characters as shown in the following embodiment. The user wishing to enter a number in a text message such as an SMS message will need normally to cycle through each character by successive key presses to reach the required numeral. As the numeral key is normally the fourth character in the sequence, a number such as "234" would take 12 key presses.

ABC2>BC2A>C2AB>2ABC selects "2"
DEF3>EF3D>F3DE>3DEF selects "3"
GHI4>HI4G>I4GH>4GHI selects "4"

The expectation of a number rather than a letter being required is accommodated by changing the order of selection. It has been found that when one numeral is selected, more than one of the selections to follow are most likely to be numerals.

With reference to FIG. 2, a flow chart is shown which illustrates an adaptive presentation. In step 201, whether the previous selection of the user is a numeral or not is determined. When the previous selection of the user is a numeral, numerals within each alphanumeric group are assigned a priority higher than letters in the group in step 202. Subsequently, in step 203, the numerals are assigned first place for selection until a letter is selected. In step 201, when a letter is selected the frequency distribution reverts to the previous frequency distribution favoring letters in step 203.

| ABC2 > BC2A > CA2B > 2ABC | selects "2" |
|---|---|
| 3DEF | selects "3" |
| 4GHI | selects "4" |

The number "234" is selected in this way with only six key presses when the order of selection has been changed to favor numerals.

Third Embodiment

The frequency distributions for individual letters in SMS messages could be computed by reference to a file of stored messages. With regard to the personalised frequency distributions in particular, it would be convenient to provide for continuous or regular updating of usage to reflect current styles. When a different personality becomes the user by reason of shared use of a phone for example, updating of personalised frequency distributions would be particularly convenient.

In some instances it will be convenient for the personalised frequency distributions associated with a particular user to be installed by that user e.g. by menu selection. In most cases, however, continuous updating of frequency of occurrence distributions will be more convenient. Preferably, priority in the alphanumeric group of characters displayed will be conferred in response to an history of use extending over a number of messages sufficient to avoid a large number of changing priorities.

To achieve this regular or continuous updating of personalised frequency distributions a frequency of occurrence of particular characters in a number of messages sent previously by the user may be computed within the phone. Similarly the frequency of occurrence of particular characters within messages received by the phone may be computed and the frequency of occurrence may be computed within the mobile phone.

Figure 4:
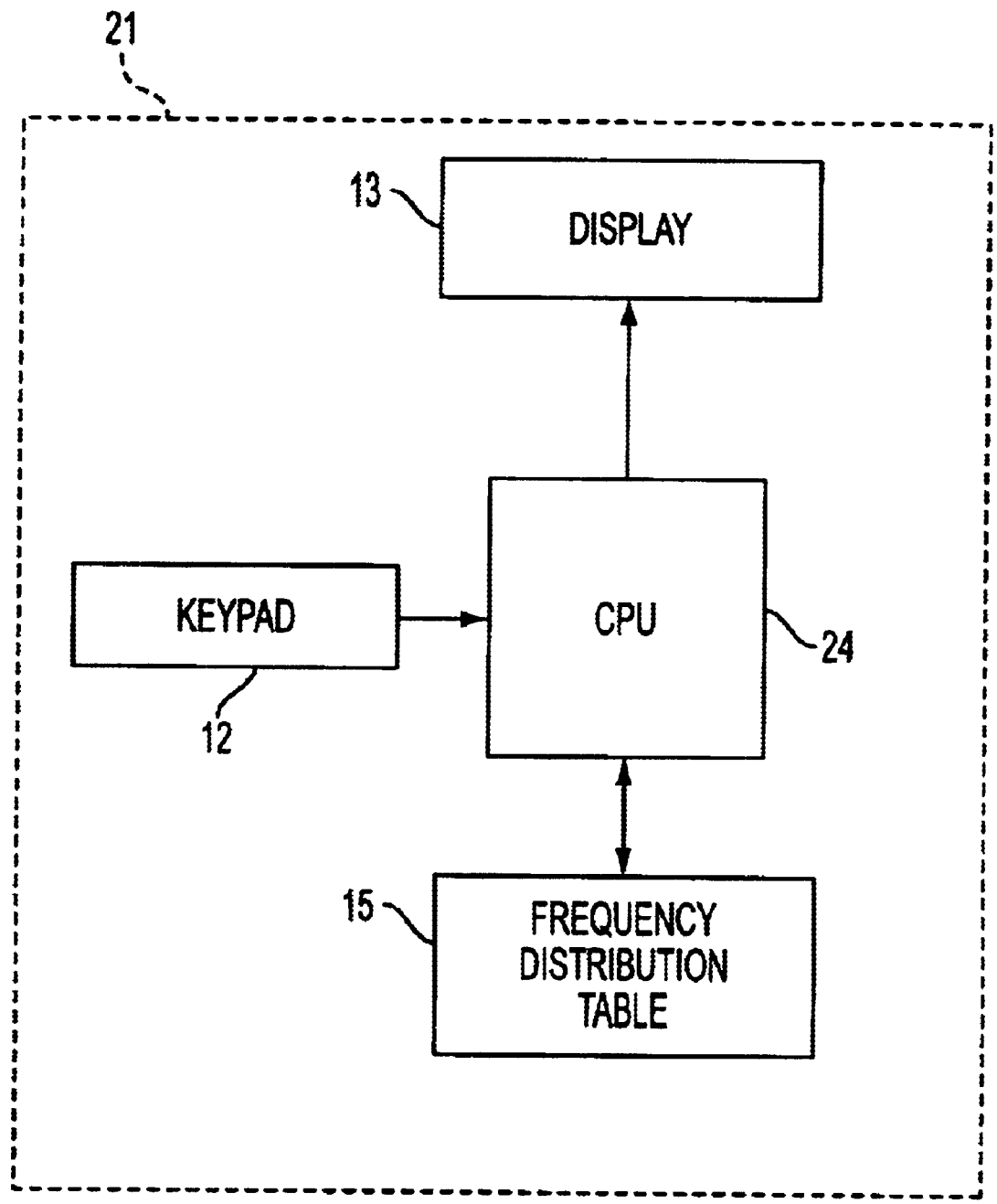
FIG. 4 is a block diagram of the third embodiment of the present invention.

With reference to FIG. 4, mobile phone 21 according to the present invention comprises display 13, keypad 12, CPU 24, and frequency distribution table 15.

The frequency distribution table 15 stores frequency occurrences of each characters in messages entered into or received by the mobile phone 21. When text messages are entered, the CPU 24 displays the character of the alphanumeric group on the display 13 in an order based on the frequency distribution stored in the frequency distribution table 15, whenever keypad 12 is operated.

Figure 5:
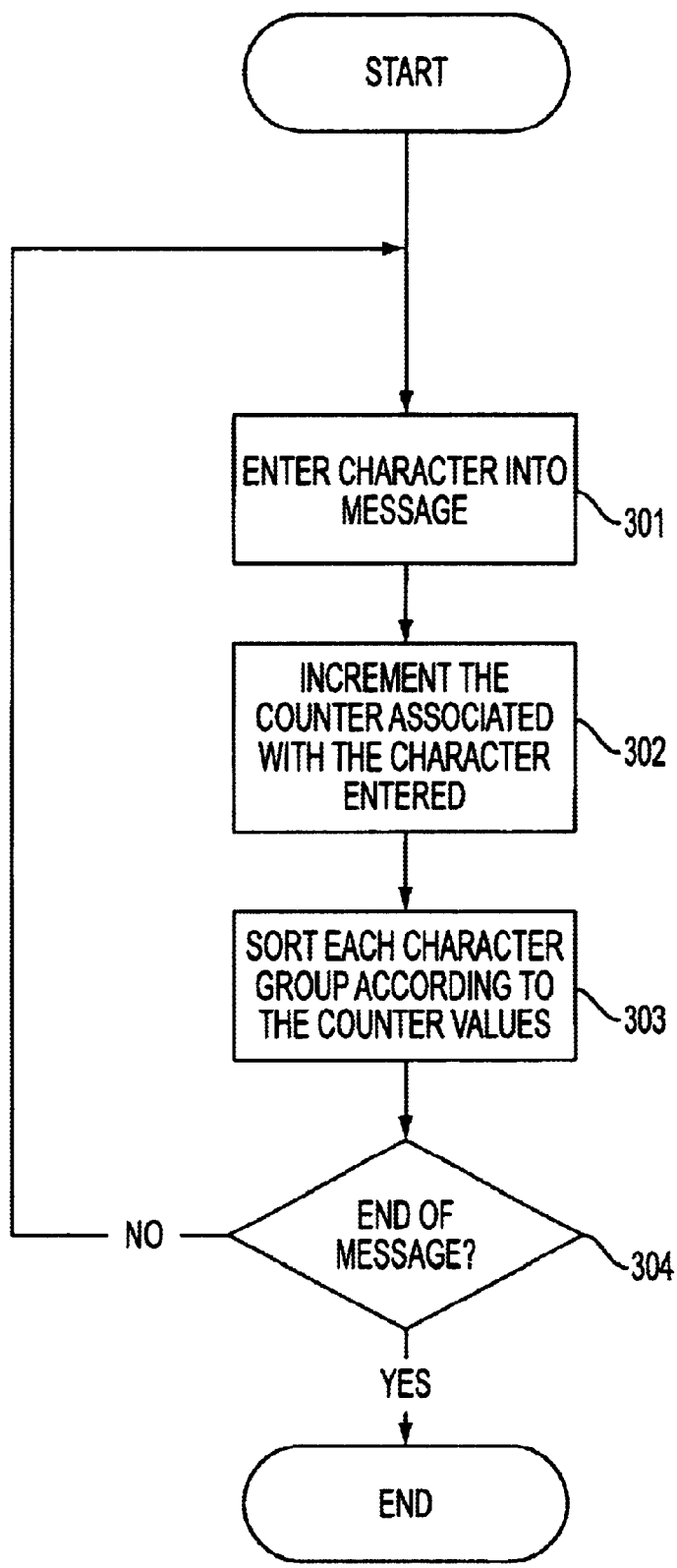
FIG. 5 is a flow diagram for updating of current probabilities in messages.

With reference to FIG. 5 a flowchart illustrates a means for updating the frequency of occurrence of particular characters in accordance with their usage in messages sent previously by the user. In step 301, at the start of a message, the first character entered is included in the message in accordance with the existing order of choice. In step 302, a counter associated with that character is then incremented. In step 303, each character group (ABCxxx, DEFxxx etc.) is then sorted according to the current counter values and higher values given precedence over lower values. As further characters of each message are entered the relevant counters are incremented to provide the current frequency of occurrence by the user. In step 304, at the end of a message, the probabilities of selection as amended by the message are maintained.

Figure 6:
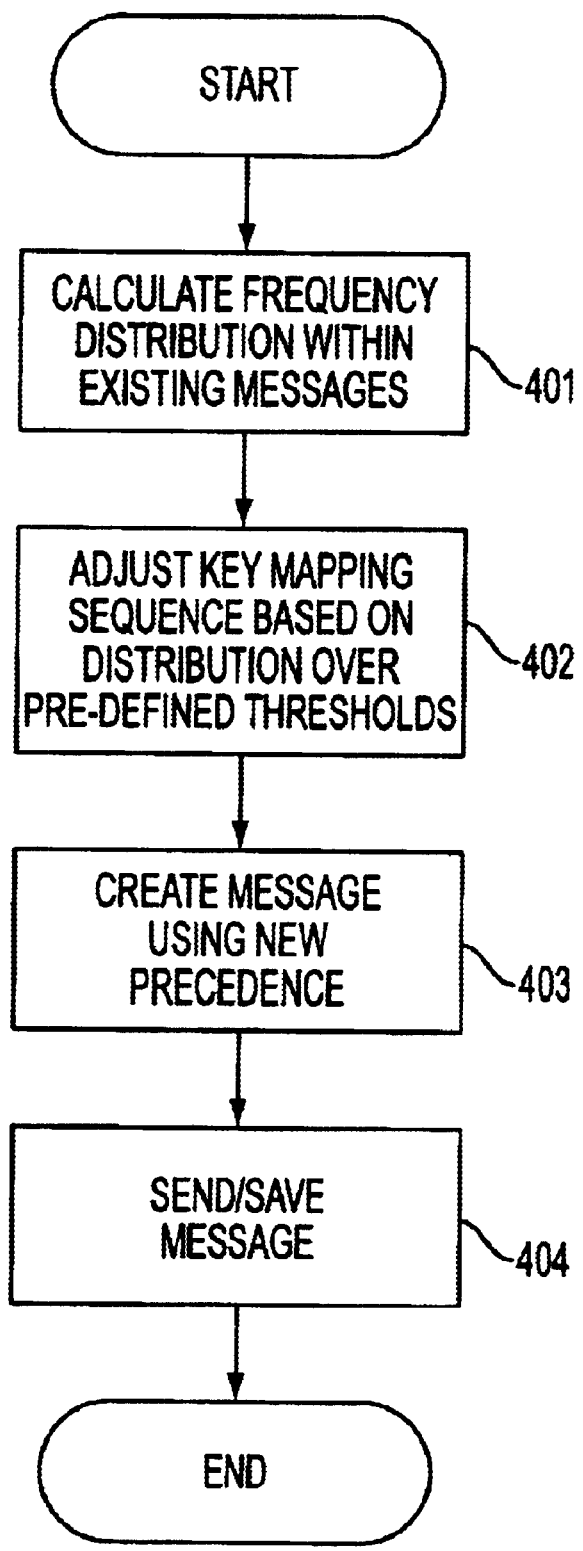
FIG. 6 is a flow diagram for updating of current probabilities in messages with a threshold applied.

In order to avoid a large number of changing priorities within the character groups and to allow an accurate estimate of the frequency distributions arising within messages the means illustrated by FIG. 6 may be implemented. With reference to FIG. 6, initially no messages have been saved and a default threshold is set. In the example given below the default threshold is set at the value 4.

In step 401, frequency distribution within existing message is calculated. In step 402, key mapping sequence is adjusted based on distribution over pre-defined thresholds. In step 403, message is created using new precedence. In step 404, message is sent and saved. This method will be described below using a concrete example.

A first message (message 1) is entered for which there has been no frequency distribution of particular characters by the user. The initial frequency distribution computed when no characters have been used is then:

A B C D E F G H I J K L M N O P Q R S T U V W X Y Z 0 0 0 0 0 0 0 0 0 0 0 0 0 0 0 0 0 0 0 0 0 0 0 0 0 0

The corresponding key sequence will be the standard sequence:

| 0 | 1 | 2 | 3 | 4 | 5 | 6 | 7 | 8 | 9 |
|---|---|---|---|---|---|---|---|---|---|
| 0+- | &-#.1 | ABC | DEF | GHI | JKL | MNO | PQRS | TUV | WXYZ |

The following message is entered and saved:

"Hello mum, how are you"

The key mapping sequence remains unchanged. Therefore the keystrokes required will be:

2+2+3+3+1+2+1+2+3+2+1+3+2+3+3+2=38

At the start of the next message (message 2) a new frequency distribution will apply, with this new frequency distribution being determined by the characters used in the previous message (message 1). Updating of the frequency distribution in accordance with message 1 will give the new frequency distribution:

A B C D E F G H I J K L M N O P Q R S T U V W X Y Z 1 0 0 0 2 0 0 2 0 0 0 2 2 0 3 0 0 1 0 0 2 0 1 0 1 0

As the pre-defined threshold value 4 has not been reached yet for any character the key sequence for message 2 will remain unchanged from that for message 1 and will be:

| 0 | 1 | 2 | 3 | 4 | 5 | 6 | 7 | 8 | 9 |
|---|---|---|---|---|---|---|---|---|---|
| 0+- | &-#.1 | ABC | DEF | GHI | JKL | MNO | PQRS | TUV | WXYZ |

The following message is entered and saved:

"Mum, I'll be home late"

Keystrokes required 1+2+1+3+3+3+2+2+2+3+1+2+3+1+1+3=33

At the start of the third message (message 3) the frequency distribution derived from the previous two messages and applied to message 3 will be:

A B C D E F G H I J K L M N O P Q R S T U V W X Y Z 2 1 0 0 5 0 0 3 1 0 0 5 5 0 4 0 0 1 0 1 3 0 1 0 1 0

The threshold value 4 has now been exceeded in respect of the characters E, L, M and O and therefore the adjusted key mapping sequence for message 3 will be:

| 0 | 1 | 2 | 3 | 4 | 5 | 6 | 7 | 8 | 9 |
|---|---|---|---|---|---|---|---|---|---|
| 0+- | &-#.1 | ABC | DEF | GHI | LJK | MON | PQRS | TUV | WXYZ |

The following message which is a repeat of message 1 is entered and saved:

"Hello mum, how are you"

The keystrokes now required with the adjusted key mapping sequence applied will be:

1+1+1+1+1+2+1+2+1+2+1+3+1+3+2+2=25

This repeated message (message 3) therefore requires 35% fewer key presses than the original message, message 1.

Fourth Embodiment

Messages sent by the user and/or messages received at the mobile phone may be used to provide the historical data for the determination of the frequency distributions. The key mapping sequence applied depends upon the history of the messages and their contents.

The threshold value is used for establishing the key sequence. The frequency of occurrence is counted for each character and where the frequency of occurrence of a first character within an alphanumeric group exceeds by an amount equal to or greater than a predetermined threshold value the frequency of occurrence of a second character within the group then the first character is assigned a higher priority in the alphanumeric group than the second character.

Consider three characters "ABC" within a group. The frequency of occurrence for each of the characters "ABC" is counted and when the count for a first character, say "B", exceeds the count for a second character, say "A", by an amount equal to or greater than the threshold value, then "B"

is given precedence over "A". An example of the effect of the threshold with increasing frequencies of occurrence is given below.

| A B C | Key sequence |
| 0 0 0 | ABC |
| A B C | Key sequence |
| 1 3 1 | ABC |
| A B C | Key sequence (B-thr)>A |
| 1 5 2 | BAC |
| A B C | Key sequence (B-thr)>A and (C-thr)>A |
| 1 5 5 | BCA |
| A B C | Key sequence (B-thr)>A and (C-thr)>A and C-thr)>B |
| 1 5 9 | CBA |
| A B C | Key sequence (C-thr)>A |
| 2 5 9 | CAB |

While preferred embodiments of the present invention have been described using specific terms, such description is for illustrative purposes only, and it is to be understood that changes and variations may be made without departing from the spirit or scope of the following claims.

What is claimed is:

1. A mobile phone comprising;
   a plurality of input means for being operated by a user when entering a message, a plurality of characters being allocated to each input means;
   a display for displaying a plurality of characters allocated to said each input means;
   a frequency distribution table for storing frequency occurrences of each character in messages entered into or received by the mobile phone; and
   a controller for updating the frequency occurrence stored in said frequency distribution table whenever a message is entered or received, and for displaying said characters on said display in an order that frequency occurrences stored in said frequency distribution table is high whenever said input means is operated, and for selecting one character among character group displayed on said display by the subsequent operation of said input means by the user.

2. A mobile phone according to claim 1, wherein when the frequency occurrence of a character in said character group exceeds a predetermined threshold value, said controller raises the display ranking of the character in the character group higher than the display ranking of the other characters.

3. A mobile phone according to claim 1, wherein when the frequency of occurrence of a first character within a character group exceeds by an amount equal to or greater than a predetermined threshold value the frequency of occurrence of a second character within said group, said controller assigns said first character a higher priority in said character group than said second character.

4. A mobile phone according to claim 1, wherein one numeral and at least one character including alphabet are allocated to said each input means.

5. A mobile phone according to claim 1, wherein said input means are keys.

6. A mobile phone according to claim 1, wherein the frequency distribution table provides storage for frequency occurrences associated with a user.

7. A mobile phone according to claim 6, wherein a personalized frequency distribution is selectable by a user of the mobile phone via a menu system.

* * * * *